United States Patent [19]
Chandler

[11] Patent Number: 5,352,056
[45] Date of Patent: Oct. 4, 1994

[54] HOIST RING WITH SELF-LOCK RETAINING RING

[75] Inventor: William M. Chandler, Ward, Ark.

[73] Assignee: The Crosby Group, Inc., Tulsa, Okla.

[21] Appl. No.: 982,783

[22] Filed: Nov. 30, 1992

[51] Int. Cl.$^5$ .......................... B66C 1/00; F16B 21/00
[52] U.S. Cl. ...................................... 403/79; 403/57; 403/78; 294/82.1; 411/353
[58] Field of Search ............ 403/79, 66, 57, 78; 411/533, 352, 353, 526, 527, 525; 294/82.1, 82.28, 82.31

[56] References Cited

U.S. PATENT DOCUMENTS

| | | |
|---|---|---|
| 2,519,460 | 8/1950 | Hansen . |
| 3,297,293 | 1/1967 | Andrews et al. . |
| 3,492,033 | 1/1970 | Mueller .................................. 403/78 |
| 3,905,633 | 9/1975 | Larson . |
| 4,431,352 | 2/1984 | Andrews . |
| 4,549,829 | 10/1985 | Springer et al. . |
| 4,570,987 | 2/1986 | Wong et al. . |
| 4,641,986 | 2/1987 | Tsui et al. . |
| 4,669,907 | 6/1987 | Patton ............................. 294/82.1 |
| 4,705,422 | 11/1987 | Tsui et al. . |
| 5,054,982 | 10/1991 | Freeman . |

FOREIGN PATENT DOCUMENTS

| | | | |
|---|---|---|---|
| 4007942 | 9/1990 | Fed. Rep. of Germany ...... 411/353 |
| 883010 | 11/1961 | United Kingdom ................ 411/527 |
| 2157786 | 10/1985 | United Kingdom ................ 411/353 |

Primary Examiner—Randolph A. Reese
Assistant Examiner—Anthony Knight
Attorney, Agent, or Firm—Kirkpatrick & Lockhart

[57] ABSTRACT

The present invention is a hoist ring provided with a central screw having a screw head at one end and a threaded shank at an opposite end. A washer is provided between the screw head and a lower bushing, with the lower bushing being secured on the screw with a self-lock retaining ring which inserts into a lower recess provided in the lower bushing. The self-lock retaining ring is provided with teeth for gripping the threaded shank. An upward oriented sleeve provided on the lower bushing extends upward to the washer. A body rotatably mounts around the sleeve by means of an axial bore provided in the body. A bail pivotally mounts to the body on an axis transverse to an axis of the lower bushing by means of shoulder pins which insert into horizontal bores of the body and which are secured therein by roll pins. The roll pins insert through vertical bores in the body and through aligned holes in the shoulder pins and are held in place by the washer and lower bushing. The bail is attachable to a load and the threaded shank is attachable to a base.

12 Claims, 2 Drawing Sheets

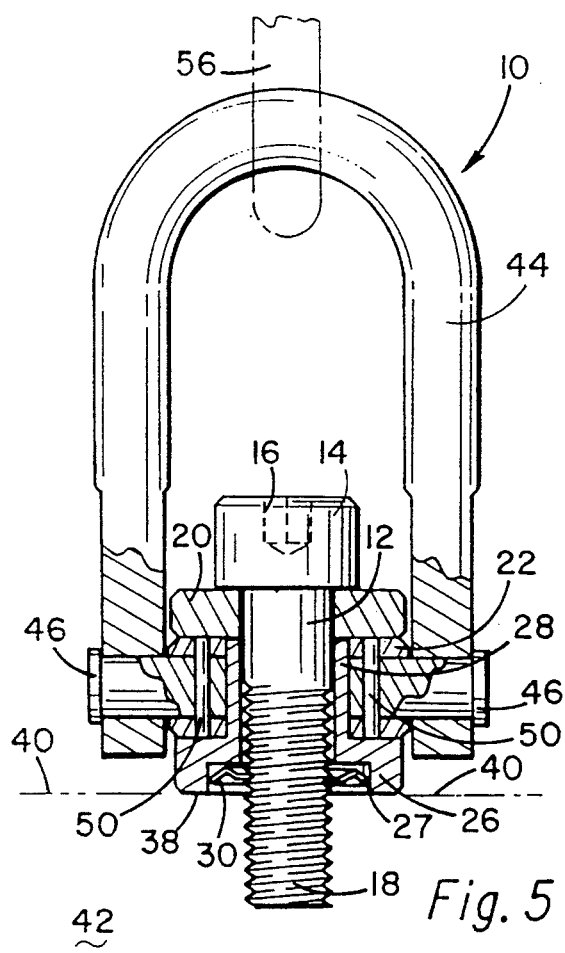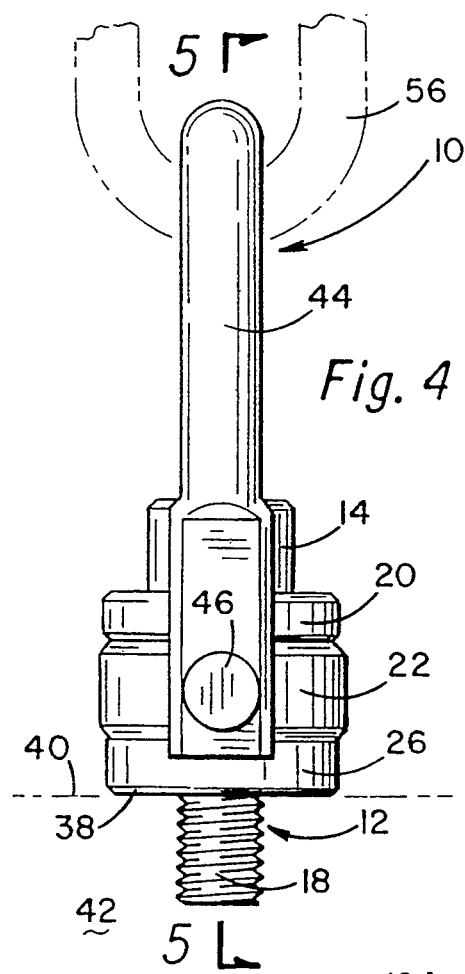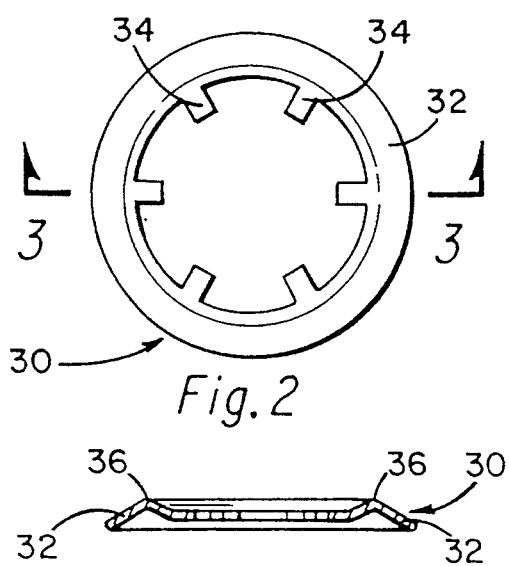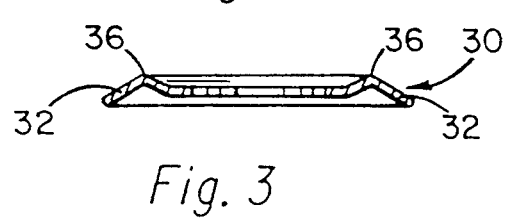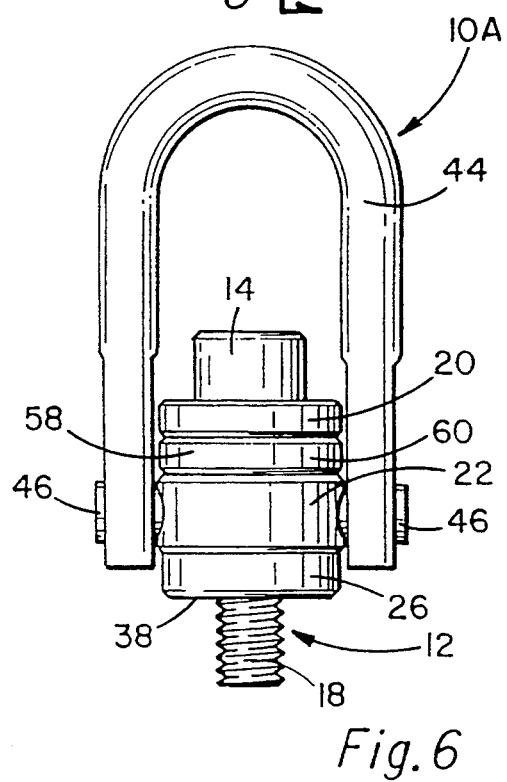

HOIST RING WITH SELF-LOCK RETAINING RING

FIELD OF THE INVENTION

The present invention relates to a hoist ring fastening device provided with new type of retaining ring for holding the fastening device together. The new type of retaining ring eliminates the need for the stud or screw shank to be provided with an annular groove therein as a place into which the retaining ring snaps.

DESCRIPTION OF THE RELATED ART

Fastening devices having a lower end securable to a load and an upper eye member end securable to a base and capable of rotating 360 degrees and pivoting 180 degrees are known in the art. For example, U.S. Pat. No. 3,297,293 issued on Jan. 10, 1967 to Andrews et al teaches such a device, which teaching is incorporated herein by reference.

One of the problems with these devices has been that the stud, usually a bolt or a screw, had to be machined after receipt from a supplier in order to provide an annular groove in its shank into which a retainer ring snapped to secure the multiple pieces of the fastening device together. Machining the bolt or screw reduced its strength and, therefore, the annular groove weakened the stud.

In 1990, the U.S. Congress enacted H.R. 3000, the "Fastener Quality Act" (hereinafter referred to as the "Act") which created procedures for the testing, certification, and distribution of certain fasteners used in commerce within the United States. The Act was enacted in order to "protect public safety, to deter the introduction of non-conforming fasteners into commerce, to improve the traceability of fasteners used in critical applications and generally to provide commercial and governmental customers with a greater assurance that fasteners meet stated specifications."

One of the provisions of the Act requires that any firm that alters fasteners covered by the Act by machining, hardening, or through some types of plating must re-certify the parts as though they were newly manufactured, with the firm which altered the fastener being considered the manufacturer.

Since existing fasteners which are similar to the present invention machine their studs, those manufacturers come under the re-certification requirements of the Act. This re-certification procedure is costly and can be avoided by practice of the present invention. The present invention utilizes a new type of retaining ring, thus eliminating the need for machining an annular groove in the stud required by previous retaining rings. Also, the cost of machining the stud is eliminated, thus, making fasteners constructed according to the present invention less expensive. Also, fasteners constructed according to the present invention utilizing non-machined studs are stronger and safer since their studs are less likely to fail under the strain of a load.

SUMMARY OF THE INVENTION

Briefly, the present invention is a hoist ring which employs a self-lock retaining ring. The hoist ring is provided with a screw having a socket containing screw head at one end and a threaded shank at an opposite end which secures the hoist ring to a base. A washer attaches around the screw and is located below the screw head and above a lower bushing and a rotatable body which surrounds the sleeve. The body is provided with an axial bore which rotatably mounts around the sleeve. The lower bushing is provided with a lower recess into which a self-lock retaining ring inserts to secure the hoist ring together. The lower bushing is also provided with a base engaging surface surrounding the lower recess engageable with a surface of the base. The self-lock retaining ring has an inverted V-shape perimeter and is provided with a plurality of inwardly oriented teeth which lock against the threaded shank when pressure is exerted on a vertex of the perimeter. A bail is pivotally secured to the body by means of shoulder pins which insert into horizontal bores located on opposite sides of the body. The shoulder pins are secured to the body by means of roll pins which insert through vertical bores provided in the body and through aligned holes in the shoulder pins, with the roll pins being held in place by the washer and the lower bushing. The bail is attachable to a load. An alternate embodiment of the present invention inserts an upper bushing between the washer and the sleeve and body to reduce friction and enhance rotation of the body.

BRIEF DESCRIPTION OF THE DRAWINGS

FIG. 2 is a top plan elevation of the self-lock retaining ring taken along line 2—2 of FIG. 1;

FIG. 3 is a cross-sectional view of the self-lock retaining ring taken along line 3—3 of FIG. 2;

FIG. 4 is a right side elevation of the hoist ring with self-lock retaining ring show attached to a base and a load;

FIG. 5 is a cross-sectional view taken along line 5—5 of FIG. 4; and

FIG. 6 is a front elevation of an alternate embodiment of the present invention provided with an upper bushing.

DETAILED DESCRIPTION OF THE PREFERRED EMBODIMENT

Figure 1:
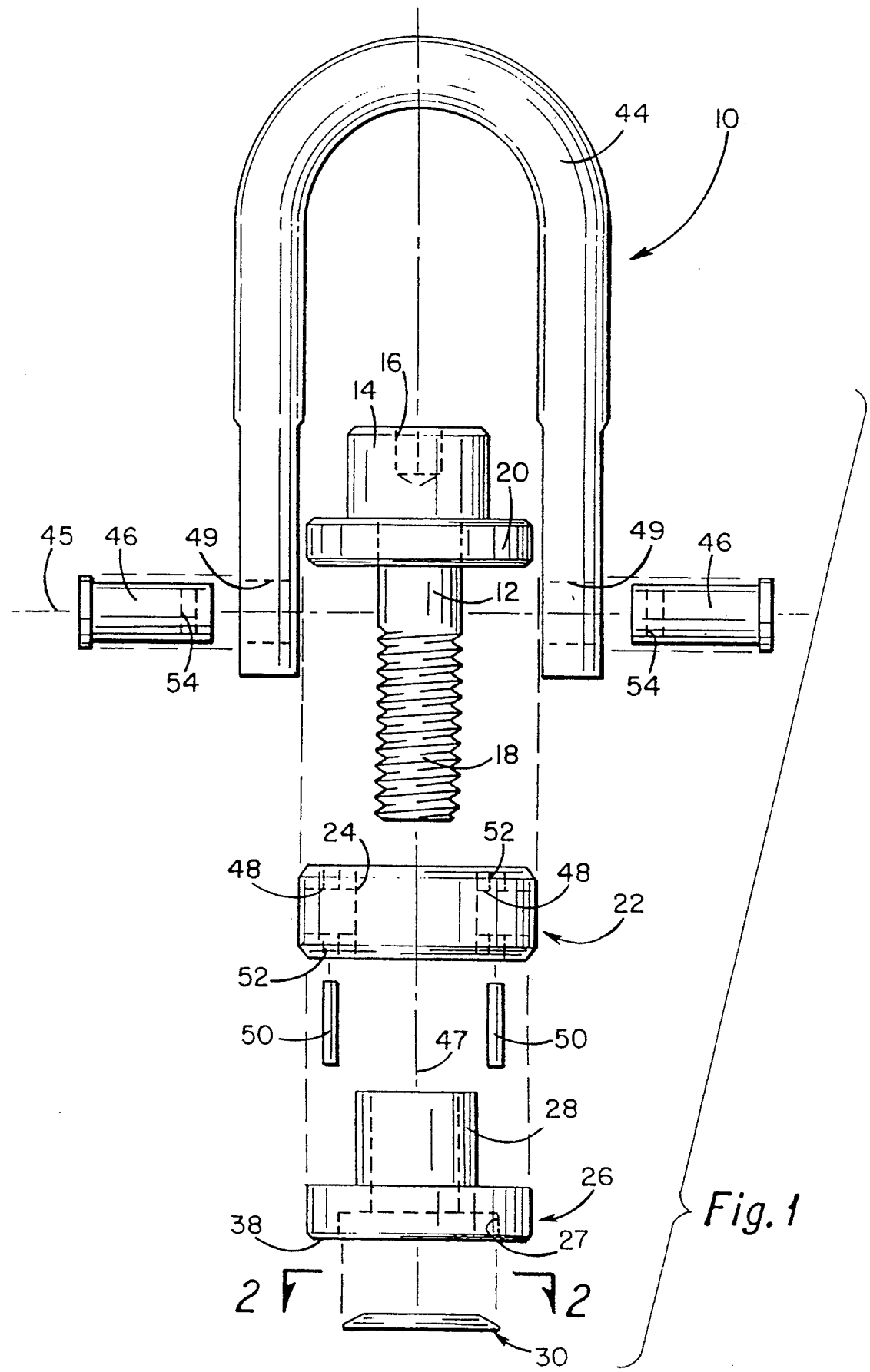
FIG. 1 is an exploded front elevation of a hoist ring with self-lock retaining ring constructed according to a preferred embodiment of the present invention.

Referring now to the drawings and initially to FIGS. 1, 4 and 5, there is illustrated a hoist ring 10 constructed according to a preferred embodiment of the present invention. The hoist ring 10 includes a screw 12 provided on one end with an enlarged screw head 14 having a socket 16 formed in the screw head 14 and provided on an opposite end with a threaded shank 18. A washer 20 is provided around the screw shank 18 adjacent the screw head 14. Adjacent to the washer 20, a body 22 having an axial bore 24 therein, is rotatably mounted on a lower bushing 26.

The lower bushing 26 is provided with an upward oriented sleeve 28 which extends upward to the washer 20, extends around the threaded shank 18 and extends between the threaded shank 18 and the axial bore 24 of the body 22. The lower bushing 26 is also provided with a lower recess 27 into which a self-lock retaining ring 30 inserts to hold the hoist ring 10 together.

As shown in FIG. 2 and 3, the self-lock retaining ring 30 has a perimeter 32 which is inverted V-shaped in cross section. A plurality of inward oriented teeth 34 are attached to the self-lock retaining ring 30. To secure the self-lock retaining ring 30 to the threaded shank 18, the self-lock retaining ring 30 is pushed, without turning, onto the threaded shank 18 and into the lower recess 27 so that the teeth 34 engage the threaded shank 18 and a vertex 36 of the inverted V-shaped perimeter 32 abuts the lower bushing 26. Pressure exerted on the vertex 36 by the lower bushing 26 causes the teeth 34 to lock against the threaded shank 18, the teeth 34 locking more securely with increasing pressure.

The lower bushing 26 is provided with a downward oriented base engaging surface 38 peripheral to and surrounding the lower recess 27. The base engaging surface 38 is secured to a surface 40 of a base 42 by means of the threaded shank 18 or by other suitable means (not illustrated). The base 42 may be ferrous or non-ferrous material.

A bail 44 of substantially U-shape has its ends pivotally connected to opposite sides of the body 22 by a pair of shoulder pins 46 so the bail 44 connects to the body 22 on a bail axis 45 transverse to a lower bushing axis 47 of the lower bushing 26. Each of the shoulder pins 46 extends through openings 49 provided in the bail 44 and through a horizontal bore 48 provided in opposite sides of the body 22 and is attached to the body 22 by means of a roll pin 50 fitted into a vertical bore 52 formed through the body 22 and extending through a compatible and aligned hole 54 formed in the shoulder pin 46. Ends of the vertical bores 52 containing the roll pins 50 are closed upward by the washer 20 and downward by the lower bushing 26 so as to hold the roll pins 50 in place.

In use, a load 56 attaches to the bail 44 and normally provides a lifting force transmitted through the hoist ring 10 to the base 42 which is attached to the hoist ring 20 adjacent the base engaging surface 38. The body 22 is rotatable 360 degrees relative to the hoist ring 10 and the bail 44 is pivotal 180 degrees relative to the hoist ring 10.

Referring now to FIG. 6, an alternate embodiment of the invention, alternate hoist ring 10A, is illustrated. This embodiment includes all the features previously described for the hoist ring 10 and, additionally, includes a special upper bushing 58 interposed between the washer 20, located above the upper bushing 58, and the body 22 and the sleeve 28 of the lower bushing 26, located below the upper bushing 58. The upper bushing 58 is preferably constructed so it functions to reduce the torque required to rotate the body 22 and, thus, enhances free rotation of the body 22 about the threaded shank 18. The upper bushing 58 may be a roller bearing (not illustrated), a roller thrust bearing (not illustrated), a reduced friction washer 60 or other suitable device. The reduced friction washer 60 is available from Garlock Bearings, Inc.; 700 Mid Atlantic Parkway; Thorofare, N.J.; 08086.

In use, the reduced friction washer 60 rotates with the body 22 so that a specially designed surface (not shown) provided on the reduced friction washer 60 abuts the washer 20 and rotates relative to the washer 20.

While the invention has been described with a certain degree of particularity, it is manifest that many changes may be made in the detailed construction and the arrangement of components without departing from the spirit and the scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A hoist ring for attaching a load to a base comprising:
   a screw adapted to be fastened to the base and having a continuous threaded shank portion,
   a lower bushing mounted about the screw, the lower bushing provided with a base engaging surface spaced away from the screw and engageable with the base,
   a body rotatably mounted on the lower bushing,
   means for connecting the load to the body,
   a washer being provided below a head of the screw and above the body and lower bushing, said head being located on an end of the screw opposite an end which attaches to the base,
   self-lock retaining ring means provided around the screw adjacent the lower bushing for engaging threads within the continuous threaded shank portion thereby holding the hoist ring together.

2. A hoist ring according to claim 1 wherein the means for connecting the load to the body is a bail, said bail being pivotally connected to the body on a bail axis transverse to a lower bushing axis, said bail being pivotable for substantially 180 degrees, said bail being connectable to the load.

3. A hoist ring according to claim 1 further comprising the self-lock retaining ring having a perimeter, said perimeter being an inverted V-shape in cross section.

4. A hoist ring according to claim 3 further comprising the self-lock retaining ring being provided with teeth which grip the threaded shank portion provided on the screw.

5. A hoist ring according to claim 4 wherein the teeth are inwardly oriented so that the teeth lock more securely against the threaded shank with increasing pressure being exerted on the self-lock retaining ring.

6. A hoist ring according to claim 1 further comprising an upper bushing being provided below the washer and above the body and lower bushing.

7. A hoist ring according to claim 6 wherein the upper bushing is a reduced friction washer.

8. A hoist ring for attaching a load to a base comprising:
   a screw adapted to be fastened to the base and having a continuous threaded shank portion,
   a lower bushing mounted about the screw, the lower bushing being engageable with the base,
   self-locking retaining ring means provided around the screw adjacent the lower bushing for engaging threads within the continuous threaded shank portion, and
   a load-attaching means movably secured to the bushing and the screw by means of the self-lock retaining ring means, 9. A hoist ring according to claim 8 further comprising:
   the lower bushing being provided with a lower recess located adjacent the screw into which the self-locking retaining ring inserts.

10. A hoist ring according to claim 8 further comprising the self-lock retaining ring being provided with a plurality of inwardly oriented teeth which lock against the threaded shank provided on the screw.

11. A hoist ring according to claim 8 wherein the self-lock retaining ring is provided with a perimeter which is an inverted V-shape in cross section so that a vertex of the perimeter abuts the lower bushing.

12. A hoist ring according to claim 8 further comprising an upper bushing being provided below the washer and above the body and lower bushing.

* * * * *